INVENTORS
ROLF BINDER
PAUL STÄHELI
ATTORNEY

United States Patent Office 3,323,177
Patented June 6, 1967

3,323,177
AUTOMATIC CAN CHANGER
Rolf Binder, Winterthur, and Paul Stäheli, Wilen, near Wil, Switzerland, assignors to Rieter Machine Works Ltd., Winterthur, Switzerland, a corporation of Switzerland
Filed Sept. 16, 1964, Ser. No. 396,832
Claims priority, application Switzerland, Sept. 18, 1963, 11,559/63
6 Claims. (Cl. 19—159)

The present invention relates to an automatic can changer for plants for depositing slivers and the like as used in spinning machines, such as cards, drawing arrangements, combers.

The can changer according to the invention includes a system for conveying cans successively from an inlet through an initial position and therefrom past a filling station to a running-out position, a movable guide rail pressing the cans arriving at the inlet against a conveyor belt, and an outer stationary guide rail which forms a continuation of the movable guide rail and begins at the initial position of the cans.

For transporting the cans moving along the stationary guide rail and not affected by the conveyor belt transport arms are provided which rotate around an axis and are swingably supported outside of said axis for swinging said arms out of the path of the cans leading to the initial position. After a signal has been given these arms are rotated through an angle corresponding to one can advance for initiating the can-changing operation.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

Figure 1:
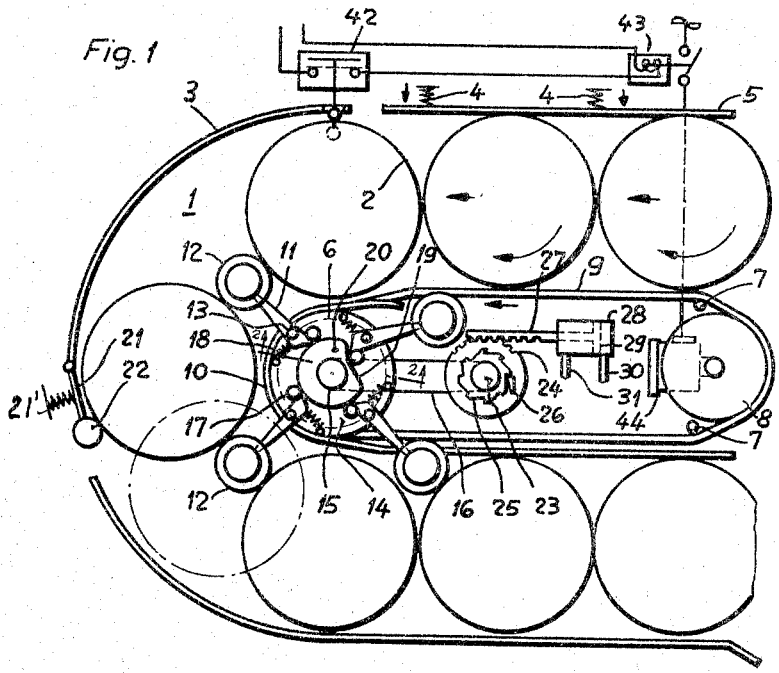
FIG. 1 is a schematic plan view of a can-changing apparatus according to the invention.

Referring more particularly to FIG. 1 of the drawing, numeral 1 designates a table supporting cans 2 and provided with an outer, stationary can guide rail 3 extending to the end of the table. A movable guide rail 5 together with a conveyor belt 9 forms an inlet path for the empty cans. Springs 4 press the rail 5 onto cans 2 and the latter against the conveyor belt 9. The conveyor belt 9 runs on guide rollers 6 and 7 and is driven by roller 8. The empty cans which are brought to the inlet side of the table 1 are pressed by the rail 5 in the direction of the arrows toward the conveyor belt 9 and roll on the rail 5 and on the belt 9 until they reach the stationary guide rail 3 and pressure on the cans ceases. Opposite the beginning of the rail 3 the running direction of the conveyor belt 9 is reversed and the cans 2 are now guided by a rigid guide rod 10 which continues to the end of the table 1 receiving the filled cans. When a can has reached the beginning of the stationary guide rail 3 it is transported by means of arms 11 whose ends are provided with rollers 12 for seizing the cans.

Figure 2:
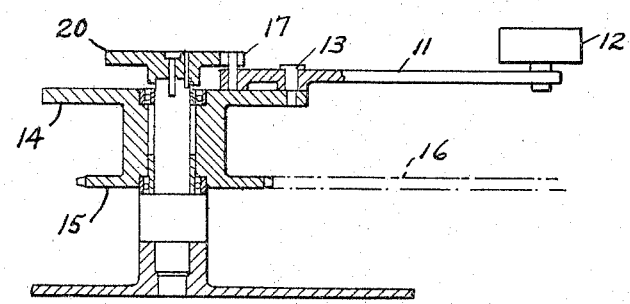
FIG. 2 illustrates a view taken on line 2—2 of FIG. 1.

Referring to FIGS. 1 and 2, the arms 11 are swingable in a horizontal plane around pins 13 mounted on a rotatable flange 14. The latter is provided with a sprocket wheel 15 around which a driving chain 16 is placed. Cam follower rollers 17 are mounted at the ends of the arms 11 close to the pins 13. The rollers 17 are pulled by springs 18 against a stationary cam 20. The cam has a portion 19 which is not circular and causes backward swinging of an arm 11 out of its normal radial position, when its roller 17 moves onto the cam portion 19. The roller of the respective arm is now out of the way of an empty can moving from the inlet to the initial position.

A roller 22 is mounted on an arm 21 swingably connected to the end of the rail 3 which is at the filling station. The arm 21 is pressed by a spring 21′ against a can which is at the filling station and between two rollers 12. Rotation of the flange 14 and of the arms 11 with the rollers 12 causes movement of a can out of the filling station against the pressure of the roller 22 past the position which is shown by a dash-dot line, into the running-out position. The chain 16 is driven by a sprocket wheel 23 which forms a unit with a gearwheel 24 and a ratchet wheel 25. A conventional pawl 26 is mounted on the gearwheel 24 and transfers rotation of the gearwheel 24 in counterclockwise direction to the ratchet wheel 25 and the sprocket wheel 23 rigidly connected thereto. The teeth of the gearwheel 24 are in mesh with the teeth of a rack 27 which is formed on the end of a rod connected to a control piston 29 reciprocable in a cylinder 28 which receives and discharges operating fluid through pipes 30 and 31.

Figure 3:
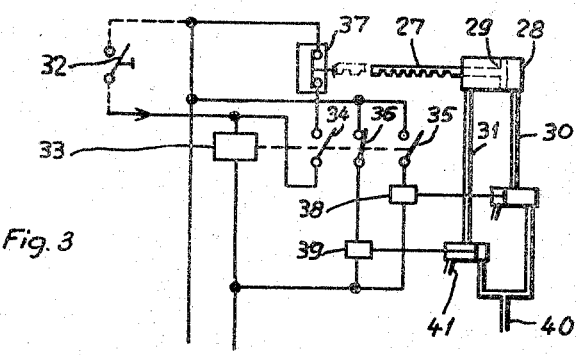
FIG. 3 is a diagram of electric wiring used in the apparatus shown in FIG. 1.

Operation of the piston 29 is more particularly shown in FIG. 3. For replacing a full can by an empty can a switch 32 is closed by hand or, for example, by means of a device measuring the length of the sliver fed into the cans. Closing of the switch 32 causes energization of a relay 33 and closing of switches 34 and 35 connected to the relay 33 and opening of a switch 36 also connected to the relay 33. Because of closing of the switch 34 and the provision of a limit switch 37 which is closed at this time the relay 33 remains energized also when the switch 32 is opened.

Closing of the switch 35 causes energization of a solenoid 38 and opening of a valve connected thereto whereas a solenoid 39 is deenergized and closes a valve connected thereto so that no pressure fluid can flow from a supply conduit 40 through a pipe 31 to the left side of the piston 29. Pressure fluid flows from the supply conduit 40 through the pipe 30 to the right side of the piston 29 and presses the piston to the left whereby pressure fluid escapes through the pipe 31 and a drain 41 on the valve which is actuated by the solenoid 39. Movement of the piston 29 to the left causes counterclockwise rotation of the gearwheel 24 through an angle 90°. The arms 11 are also advanced through an angle 90° so that a subsequent can is brought into the position so far occupied by a preceding can. When the rack 27 has reached leftmost position the limit switch 37 is opened and the relay 33 is deenergized so that the switches 34 and 35 are opened and the valves actuated by the solenoids 38 and 39 control flow of pressure medium to and from the cylinder 28 for moving the piston 29 to its right end position. Because of the ratchet arrangement 25, 26 and flange 14 is not rotated when the piston 29 moves to the right.

When a can has reached the initial position at the beginning of the rail 3 a limit switch 42 is opened by the can to stop current flow through a solenoid 43 actuating a switch controlling current supply to a motor 44 which drives the drive wheel 8 of the conveyor belt 9. If there is no can in the initial position the limit switch 42 and the switch actuated by the solenoid 43 are closed so that the motor 44 drives the drive wheel 8 and the conveyor belt 9.

We claim:

1. An automatic can changer comprising means for successively transporting cans from an inlet to an initial position and thereafter through a filling station to a running-out position, said means including;

a conveyor belt having a run moving from said inlet to said initial position, a movable guide rail placed opposite and spaced from said run of said conveyor belt to form an inlet path for the cans, means pressing said guide rail against the cans in said inlet path for pressing the cans against said conveyor belt and allowing the latter to transport the cans through said inlet path to said initial position, and a stationary guide rail placed opposite and spaced from said conveyor belt forming a continuation of said movable guide rail for forming a path for the cans extending from said inlet through said initial position to said filling station, and means extendable into the path for the cans for transporting the cans from the initial position to the running-out position;

2. In an automatic can changer having means for successively transporting cans from an inlet to an initial position and thereafter through a filling station to a running-out position:

a conveyor belt having a run moving from said inlet to said initial position, a movable guide rail placed opposite and spaced from said run of said conveyor belt to form an inlet path for the cans, means pressing said guide rail against the cans in said inlet path for pressing the cans against said conveyor belt and allowing the latter to transport the cans through said inlet path to said initial position, a stationary guide rail placed opposite and spaced from said conveyor belt and forming a continuation of said movable guide rail for forming a path for the cans extending from said inlet through said initial position to said filling station, drive means for said conveyor belt, control means for controlling operation of said drive means, said control means including means responsive to the presence of a can in said initial position for stopping said drive means when a can is in said initial position and for starting said drive means when a can is absent from said initial position.

3. In an automatic can changer having means for successively transporting cans from an inlet to an initial position and thereafter through a filling station to a running-out position:

a conveyor belt having a run moving from said inlet to said initial position, a movable guide rail placed opposite and spaced from said run of said conveyor belt to form an inlet path for the cans, means pressing said guide rail against the cans in said inlet path for pressing the cans against said conveyor belt and allowing the latter to transport the cans through said inlet path to said initial position, a stationary guide rail placed opposite and spaced from said conveyor belt forming a continuation of said movable guide rail for forming a path for the cans extending from said inlet through said initial position to said filling station, a rotatable element, arms swingably connected to said rotatable element and extendable into the path for the cans extending from said initial position through the filling station to the running-out position, for transporting the cans from the initial position to the running-out position, means operatively connected to said arms for swinging said arms out of the path of the cans between said inlet and said initial position, means for rotating said element, and actuating means for temporarily actuating said rotating means for moving a can from said initial position to said filling station and thereafter to said running-out position.

4. In an automatic can changer as defined in claim 3, wherein said means for swinging said arms out of the path of the cans includes a stationary cam, cam follower rollers mounted on said arms, and means urging said rollers onto said cam.

5. In an automatic can changer as defined in claim 3, wherein said rotating means includes a piston reciprocating in a cylinder, a piston rod connected to said piston, ratchet means operatively connecting said piston to said rotatable element for rotating the latter upon movement of said piston in one direction only, and means for supplying and discharging a pressure fluid to and from said cylinder, and wherein said actuating means includes means for controlling the supply and discharge of a pressure fluid to and from said cylinder.

6. In an automatic can changer according to claim 5, wherein said control means includes solenoids and pressure fluid valves individually actuated by said solenoids, and switch means for controlling energization of said solenoids for replacing a can filled in the filling station by an empty can from the initial position.

References Cited

UNITED STATES PATENTS

| | | | |
|---|---|---|---|
| 2,767,536 | 10/1956 | Forkel | 198—160 |
| 3,249,968 | 5/1966 | Whitehurst | 19—159 |

FOREIGN PATENTS 865,820  4/1961  Great Britain.

MERVIN STEIN, *Primary Examiner.*

I. C. WADDEY, *Assistant Examiner.*